June 15, 1965  A. M. KILLIN ETAL  3,189,673
ELECTRODE HOLDER
Original Filed March 1, 1961  2 Sheets-Sheet 2

INVENTORS
ARTHUR M. KILLIN
LA MONT F. MC CLINCY
OSCAR W. GRAVELEY

BY
ATTORNEY

United States Patent Office 3,189,673
Patented June 15, 1965

3,189,673
ELECTRODE HOLDER
Arthur M. Killin, Ashtabula, Ohio, La Mont F. McClincy, Florence, Ala., and Oscar W. Graveley, Sanborn, N.Y., assignors to Union Carbide Corporation, a corporation of New York
Continuation of abandoned application Ser. No. 92,643, Mar. 1, 1961. This application Sept. 19, 1962, Ser. No. 224,617
5 Claims. (Cl. 13—14)

This application is a continuation of Serial No. 92,643, filed March 1, 1961, now abandoned.

The present invention relates to an improved apparatus for supporting an electrode in an electric furnace and for providing an efficient electrical contact at the surface of the electrode.

In electric arc furnaces employed in various metallurgical operations the electrodes of the furnaces are most often of considerable size and weight and accordingly a well designed supporting mechanism is required which will maintain the electrode in a proper position within the electric furnace and which will not subject the electrode surfaces to excessive pressures which might damage the electrode to the extent that the operation of the furnace would be interrupted or made grossly inefficient.

The above considerations are very important with all types of electrodes and particularly with electrodes of the self-baking types since, with this type of electrode, it is essential that the compressive forces acting thereon be substantially symmetrically balanced and distributed.

It is also required in electric arc operations that a contact mechanism be provided for the conduction of electrical energy from a suitable source to the electrode and it is essential that the contact mechanism which is provided be efficient regardless of imperfections in the surface of the electrode and/or variation in electrode diameter. It is also most desirable that the contact mechanism provided establish a continuous and efficient electrical contact with the electrode during both normal operating conditions and during the intervals when the electrode is slipped, i.e. lowered, to replace a consumed portion thereof. It is also of advantage, under various operating conditions, that the electrode contact mechanism additionally provide support for at least a portion of the weight of the electrode so that the supporting pressures exerted on the electrode are distributed and consequently the possibility of damage to the electrode surface is minimized.

It is an object of the present invention to provide an apparatus for supporting, slipping and electrically energizing electrodes of either the pre-baked or self-making type whereby the supporting forces on the electrode are distributed to minimize the possibility of damage to the electrode and whereby electrical energy is efficiently conducted to the electrode during both normal operation and during slipping operations of the electrode.

Other objects will be apparent from the following description and claims in which:

Figure 1:
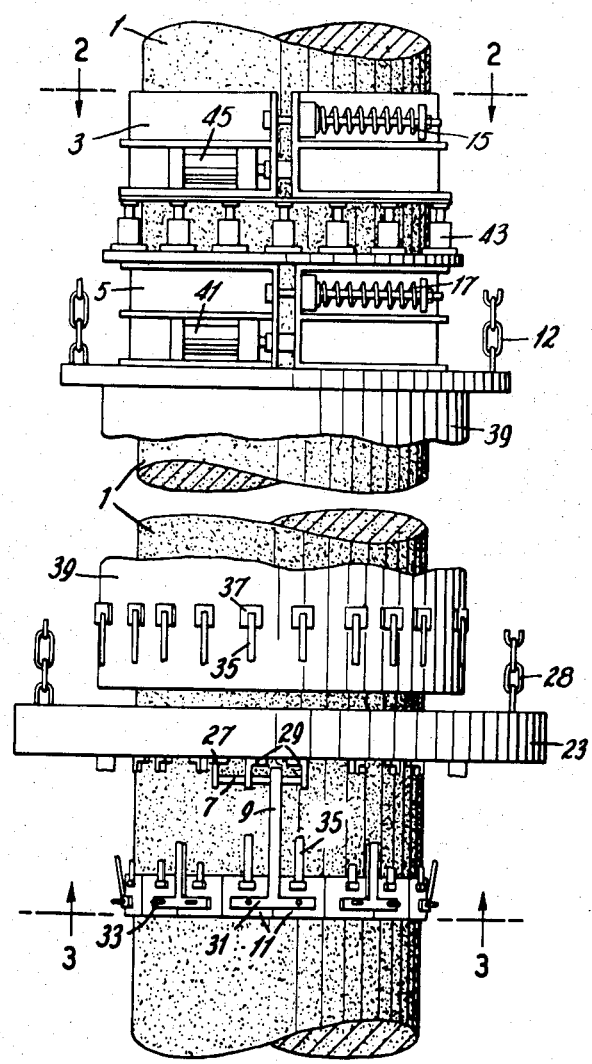
FIGURE 1 shows an elevation view of an apparatus of the present invention for supporting and slipping an electrode and for providing a continuous electrical contact at the electrode surface.
Figure 4:
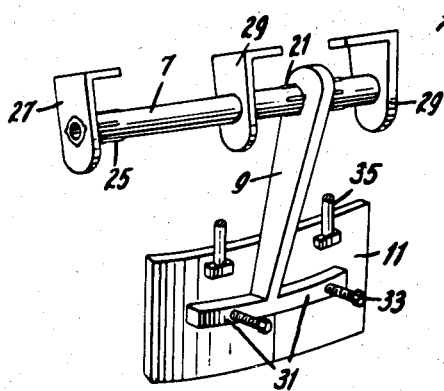

FIGURE 4 separately illustrates a portion of the electrode contact assembly of FIGURE 1.

With reference to the drawing, an electrode 1, either of the pre-baked or self-baking type, is supported during normal operation by means of hinged clamps 3 and 5 and by the lower electrode contact assembly which comprises torsion-bars 7, rigid arms 9 and electrode contacts 11.

Figure 2:
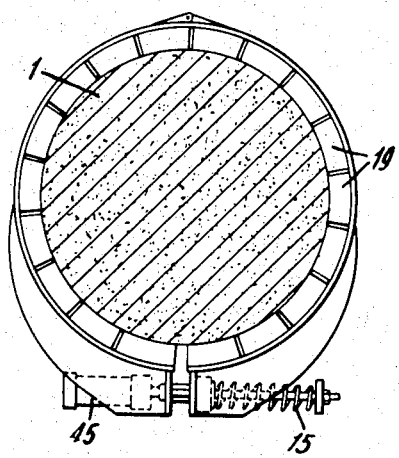
FIGURE 2 is a sectional plan view along 2—2 of FIGURE 1.
Figure 3:
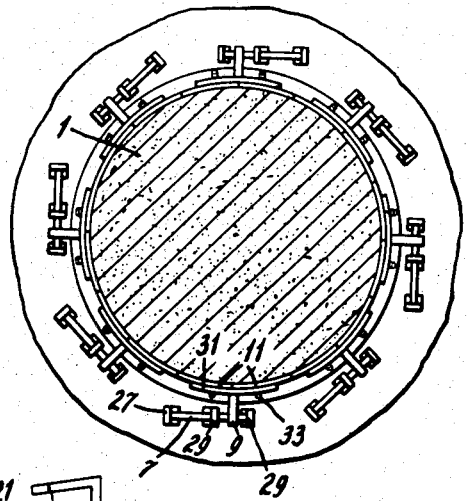
FIGURE 3 is a sectional bottom view along 3—3 of FIGURE 1.

The electrode contact assembly is arranged and adjusted to support a portion of the weight of the electrode and clamps 3 and 5 are designed so that either one of these clamps, together with the electrode contact assembly, can support the full weight of the electrode. Clamp 5 is supported in a stationary position by means of chains 12 or other suitable means. Clamps 3 and 5 are substantially identical and each comprises two hinged sections. Springs 15 and 17 respectively maintain both clamps 3 and 5 in a closed position during normal operation whereby friction blocks 19, mounted symmetrically about the electrode on the inner side of both clamps 3 and 5, are caused to forcibly contact the electrode. The friction blocks 19, illustrated in FIGURE 2, are formed of hard formed asbestos, roughened metals or other similarly suitable material, and provide the necessary frictional forces for supporting a portion of the weight of the electrode and permit the use of electrodes having relatively uneven surfaces. The electrode contacts 11 are arranged symmetrically about the electrode and are held in forcible contact therewith by means of rigid arms 9, which are fixedly connected to metal bars 7 by splines 21.

The metal bars 7 are fixedly mounted at only one end to ring support member 23 by means of splines 25 and clevis mounts 27. Ring member 23 is supported in a stationary position by means of chains 28 or other suitable means. Supporting mounts 29 spaced away from the fixed ends of the bars 7 provide additional support for the bars 7, however, the rotation of the bars 7 is in no way restrained by the supporting mounts 29 and accordingly the bars 7 can be torsionally rotated. Rigid arms 9, connected to the bars 7, are provided with laterally extending ribs 31 which are disposed opposite the electrode contacts 11. Bolts 33 threadably engage rigid arms 9 at the lateral ribs 31 and are adjusted to forcibly contact the electrode contacts 11. By suitably adjusting bolts 33 the metal bars 7 can be individually torsionally deformed to thereby cause forces proportional to the deformation to be exerted on the electrode contacts 11.

Each metal bar 7 is disposed transverse to the longitudinal axis of the electrode having the portion thereof at which the rigid arm 19 is fixed substantially perpendicular to the radium of the electrode which intersects this portion. By virtue of this arrangement, any forces acting on the electrode contacts are normal to the surface of the electrode.

The bolts 33 can be readily and individually adjusted so that the forces between the electrode contacts and the electrode surface are substantially uniform around the periphery of the electrode and sufficient to provide an efficient electrical contact at the electrode surface while supporting a portion of the electrode weight. Under some circumstances an improved electrical contact can be provided by engaging the bolts 33 to the contact plates 11 through suitable ball-joint type couplings (not shown). The electrode contacts 11 are connected to a suitable source of electrical energy through conductors 35 which are supportably mounted by brackets 37 on electrode shield 39.

In normal operations, metal bars 7 are individually torsionally deformed by adjustment of bolts 33 to thereby cause contacts 11 to forcibly contact the electrode and support a portion of the weight of the electrode. At the same time, clamps 3 and 5 are maintained in a closed position by means of springs 15 and 17 to thereby forcibly contact the electrode. Although both clamps 3 and 5 are normally closed, either one of these upper clamps in conjunction with the lower electrode contact assembly are capable of supporting the full weight of the electrode.

Whenever it is necessary to slip the electrode to replace the consumed portion thereof, a hydraulic cylinder 41, mounted on clamp 5, is actuated to cause spring 17 to release clamp 5 whereby the electrode and clamp 3 move downward, due to the unsupported portion of the weight of the electrode, on hydraulically operable jacks 43 which are mounted between clamps 3 and 5. In its downward movement the electrode is forced through contacts 11 which continue to provide electrical contact with the electrode during the slipping operation.

The rate and extent of the downward movement of the electrode is controlled by jacks 43. When the electrode has been slipped the full distance permitted by jacks 43, the electrode is supported in this new position by clamp 3 and the lower electrode contact assembly. After completion of the slipping operation, hydraulic cylinder 41 is deactuated and spring 17 once again causes clamp 5 to forcibly contact the electrode. Hydraulic cylinder 45 is then actuated to cause clamp 3 to be released from forcible contact with the electrode and jacks 43 are actuated to raise the released clamp 3 to its initial position. When clamp 3 is thus returned to its initial position, hydraulic cylinder 45 is deactuated and clamp 3 is thereupon placed once again in forcible contact with the electrode by means of spring 15; the slipping operation may now be repeated when necessary. Throughout the slipping operation electrode contacts 11 continue in forcible contact with the electrode maintaining an efficient electrical contact therewith and, in addition, limiting the rate of electrode descent thereby avoiding the possibility of damaging stresses on the apparatus.

In FIGURE 4 of the drawing, a portion of the lower electrode contact assembly is shown separated from the remainder of the apparatus. FIGURE 4 shows torsion bar 7 to be in the form of a metal tube fixedly mounted to clevis mount 27 and rigid arm 9. It is preferred that torsion bars 7 be constructed from a material having an elastic limit in excess of 100,000 p.s.i.g., e.g. SAE 6150 (0.48 to 0.53 carbon, 0.70 to 0.90 manganese, 0.80 to 1.0 chromium, minimum 0.15 vanadium) and SAE 9245, a high silicon steel (1.8 to 2.2 silicon, 0.43 to 0.48 carbon and 0.7 to 0.95 manganese).

In a specific embodiment of the present invention, used in operation with a 40 inch diameter electrode (initial weight 66,000 lbs.), each torsion bar 7 was a hollow steel tube (SAE 6150) having an inner diameter of 2.00 inches and an outer diameter of 2.50 inches. The length of each bar from its fixed end to the point at which the rigid arm 9 was connected thereto was approximately 17½ inches; the length of the rigid arm from its connection at the hollow bar to the level of the threaded members was about 20½ inches. The complete electrode contact assembly comprised 8 hollow bars, each having a rigid arm connected thereto, and 16 electrode contacts. The electrode contact assembly was arranged generally as illustrated in the drawing and supported approximately 20,000 pounds of electrode weight. In another operation, the electrode contact assembly of the present invention has supported up to 80,000 lbs. of electrode weight.

It may be seen from the drawing and the above description that many beneficial results are provided by the apparatus of the present invention. For example, the provision of upper clamps which are at all times acted upon by the positive forces of springs ensures that, in the event of a breakdown in the hydraulic system of the apparatus, the electrode will not fall but will continue to be supported. Additionally, the distribution of the supporting forces between the upper clamps and the lower electrode contact assembly substantially reduces the possibility of damage to the electrode due to compressive forces. Further, the torsion bar feature of the electrode contact assembly provides a relatively inexpensive, compact, and readily adjustable means for contacting and supporting an electrode.

What is claimed is:

1. An apparatus for contacting and supporting and slipping a vertically positioned electrode which comprises a plurality of metal bars symmetrically disposed about the electrode adjacent thereto and transverse to the longitudinal axis thereof; each said bar being fixedly held at only one portion thereof and extending to form an acute angle with the radius of the electrode passing through said fixed portion and extending to perpendicularly intersect a radius of said electrode; a plurality of rigid arms fixed respectively to each of said bars at the portion thereof perpendicularly intersecting a radius of the electrode each of said rigid arms extending downwardly and transverse to the bar affixed thereto; electrode contact means spaced downward from said metal bars and being in contact with the electrode and being disposed between said rigid arms and the electrode; a plurality of adjusting means engaged respectively to said rigid arms and engaging said contact means for increasing the distance therebetween to an extent whereby due to the resultant torsional deformation of said metallic bars said electrode contact means is caused to forcibly contact and support a portion of the weight of the electrode; means for connecting said electrode contact means to a suitable source of electrical energy; a first fixedly mounted clamp and a first spring engaging said first clamp normally maintaining said first clamp in forcible contact with the electrode, said first clamp being adapted to be capable of supporting, in conjunction with the electrode contacts, the full weight of the electrode; a second clamp adapted to be moved in a vertical direction and a second spring engaging said second clamp normally maintaining said second clamp in forcible contact with the electrode, said second clamp being adapted to be capable of supporting, in conjunction with the electrode contacts, the full weight of the electrode; a first hydraulic cylinder operably coupled to said first spring being adjustable to deform said first spring and thereby release said first clamp whereby the electrode is supported only by the second clamp and said electrode contact means; a second hydraulic cylinder operably coupled to said second spring and adjustable to deform said second spring and release said second clamp whereby the electrode is supported by only the first clamp and said electrode contact means; means operably connected between said clamps for lowering the second clamp and the electrode a predetermined distance when the electrode is supported only by the second clamp and said electrode contact means and for raising the second clamp a predetermined distance after the lowering thereof when the electrode is supported only by the first clamp and said electrode contact means; said electrode being forced through said electrode contact means during the lowering adjustment thereof.

2. An apparatus in accordance with claim 1 wherein said first and second clamps are each provided with a plurality of friction blocks, said friction blocks being fixed interior said clamps between said clamps and the electrode.

3. An apparatus in accordance with claim 1 wherein said metal bars comprise a plurality of hollow steel bars having an elastic limit in excess of 100,000 p.s.i.g.

4. An apparatus in accordance with claim 1 wherein said adjusting means comprises a plurality of threaded members threadably engaging said rigid arms and extending therethrough normal to the electrode surface to forcibly contact said electrode contact means.

5. An apparatus for contacting and supporting and slipping a vertically positioned electrode which comprises an annular support member surrounding a lower portion of said electrode and arranged in central alignment therewith; a plurality of metal bars symmetrically disposed about the electrode adjacent thereto and transverse to the longitudinal axis thereof; each said bar being fixedly connected at only one portion thereof to said support member and extending to form an acute angle with the radius of the electrode passing through said fixed portion and extending to perpendicularly intersect a radius of said electrode; a plurality of rigid arms fixed respectively to each of said bars at the portion thereof perpendicularly intersecting a radius of the electrode, each of said rigid arms extending downwardly and transverse to the bar affixed thereto; electrode contact means spaced downward from said metal bars and being in contact with the electrode and being disposed between said rigid arms and the electrode; a plurality of adjusting means engaged respectively to said rigid arms and engaging said contact means for increasing the distance therebetween to an extent whereby due to the resultant torsional deformation of said metallic bars said electrode contact means is caused to forcibly contact and support a portion of the weight of the electrode; means for connecting said electrode contact means to a suitable source of electrical energy; a first fixedly mounted clamp positioned above and spaced away from said support member and a first spring engaging said first clamp normally maintaining said first clamp in forcible contact with the electrode, said first clamp being adapted to be capable of supporting, in conjunction with the electrode contacts, the full weight of the electrode; a second clamp arranged below said first clamp spaced away from said support member being adapted to be moved in a vertical direction and a second spring engaging said second clamp normally maintaining said second clamp in forcible contact with the electrode, said second clamp being adapted to be capable of supporting, in conjunction with the electrode contacts, the full weight of the electrode; a first hydraulic cylinder fixedly mounted on said first clamp being operably coupled to said first spring and adjustable to deform said first spring and thereby release said first clamp whereby the electrode is supported only by the second clamp and said electrode contact means; a second hydraulic cylinder fixedly mounted on said second clamp being operably coupled to said second spring and adjustable to deform said second spring and release said second clamp whereby the electrode is supported by only the first clamp and said electrode contact means; means operably connected between said clamps for lowering the second clamp and the electrode a predetermined distance when the electrode is supported only by the second clamp and said electrode contact means and for raising the second clamp a predetermined distance after the lowering thereof when the electrode is supported only by the first clamp and said electrode contact means; said electrode being forced through said electrode contact means during the lowering adjustment thereof.

References Cited by the Examiner
UNITED STATES PATENTS
3,122,600   2/64   Souchet _____ 13—14

FOREIGN PATENTS
598,735   5/60   Canada.
1,061,457   7/59   Germany.

RICHARD M. WOOD, *Primary Examiner.*